Nov. 20, 1945.                M. C. SNYDER                    2,389,168
                        MEANS FOR STORING LIQUID FUEL
                Filed July 3, 1944              2 Sheets-Sheet 1
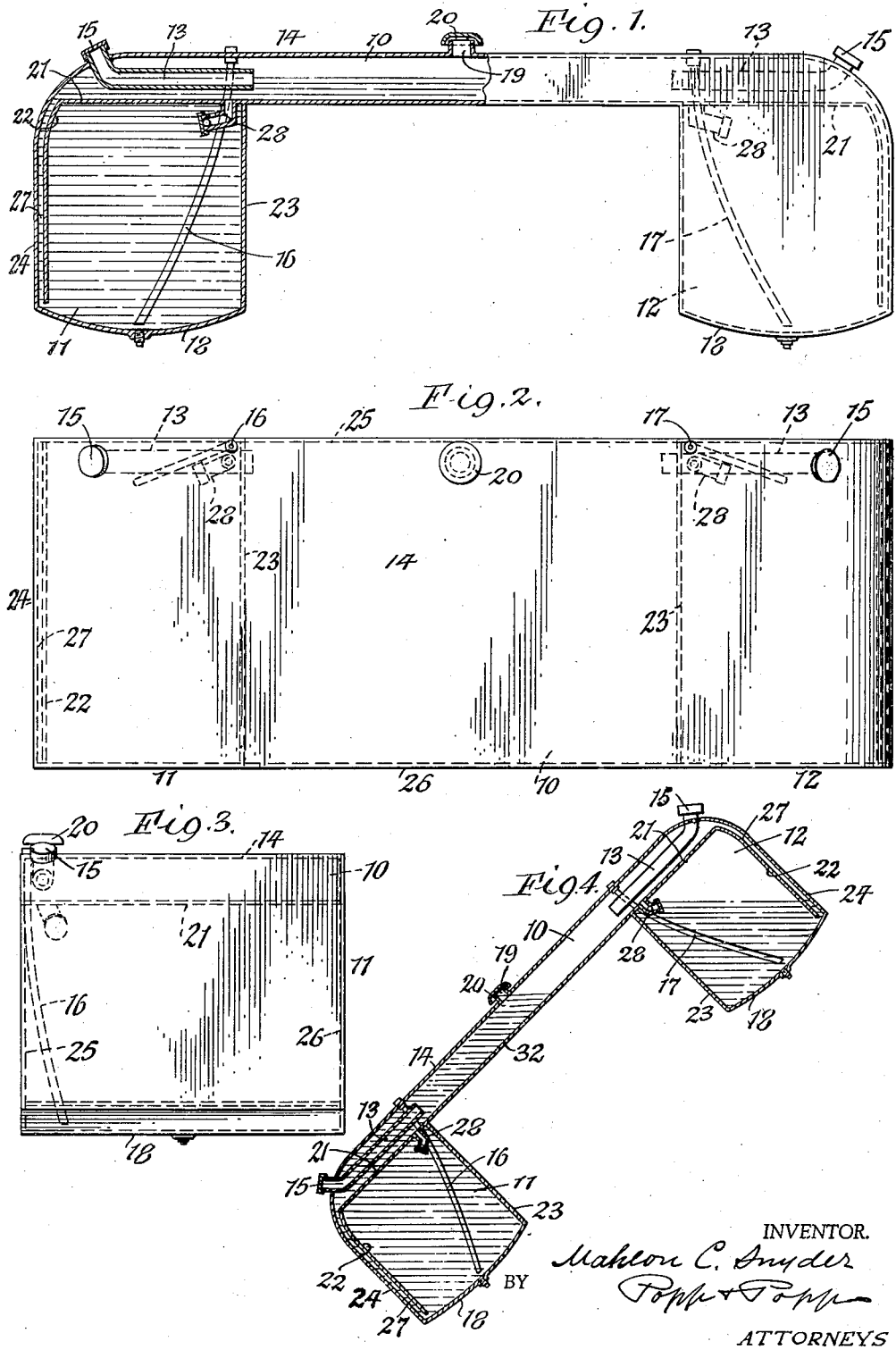

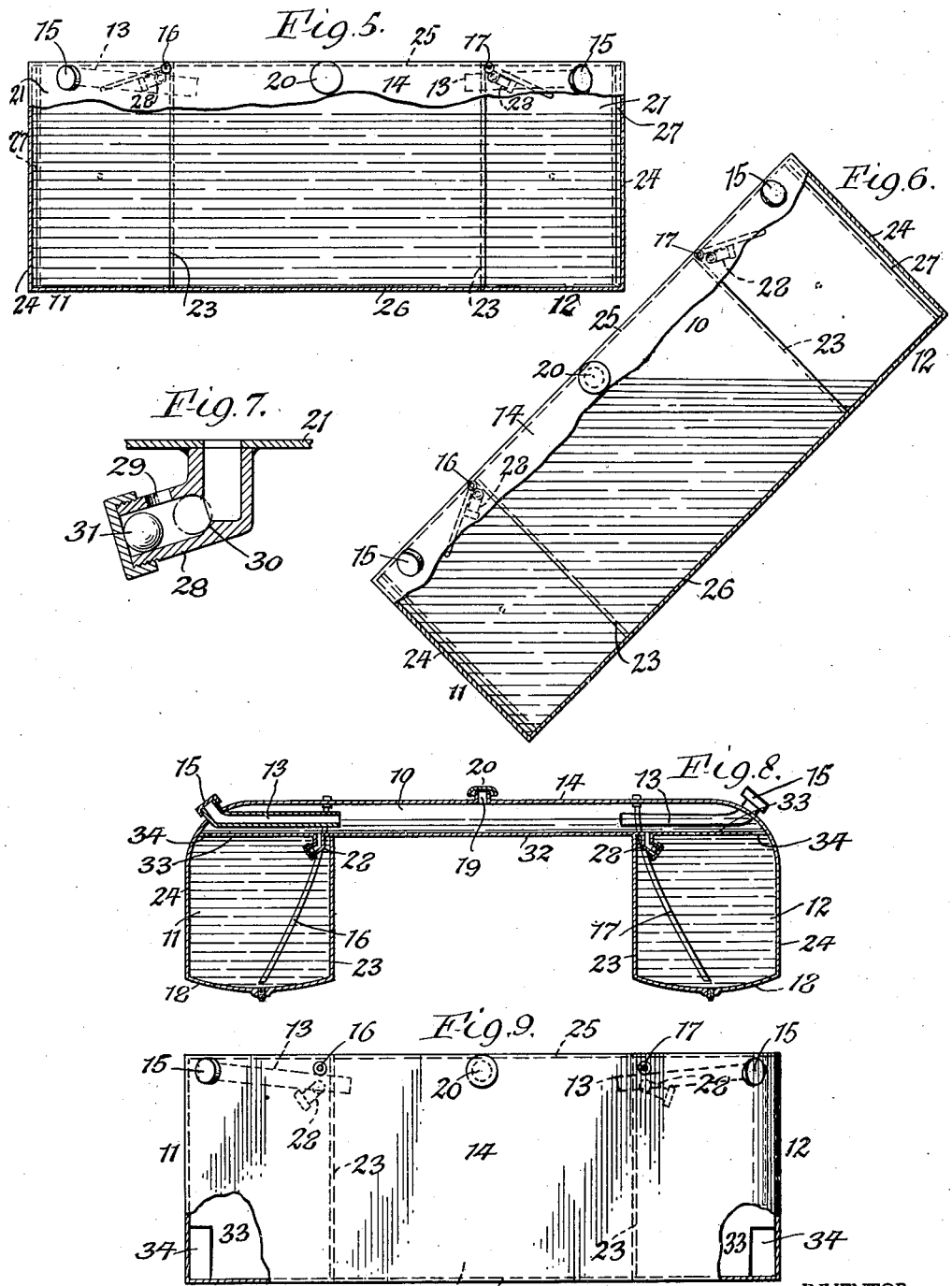
Nov. 20, 1945. M. C. SNYDER 2,389,168
MEANS FOR STORING LIQUID FUEL
Filed July 3, 1944 2 Sheets-Sheet 2
INVENTOR.
Mahlon C. Snyder
BY
Popp + Popp
ATTORNEYS Patented Nov. 20, 1945

2,389,168

UNITED STATES PATENT OFFICE 2,389,168

MEANS FOR STORING LIQUID FUEL

Mahlon C. Snyder, Hamburg, N. Y.

Application July 3, 1944, Serial No. 543,281

8 Claims. (Cl. 137—21)

This invention relates to improvements in gasolene or fuel tanks whereby a supply of liquid fuel is carried in large quantities on transportation vehicles, such as trucks, airplanes and the like and more particularly to saddle-shaped auxiliary tanks whereby an extra supply of liquid fuel is carried on trucks in addition to the regular liquid fuel storage tanks so as to enable these trucks to travel longer distances before it becomes necessary to replenish the fuel supply.

Owing to the large capacity of such tanks it is important to reduce to a minimum the amount of liquid fuel which can escape from the same when the truck is upset or injured in case of collision, skidding or other cause and thus reduce to a great extent fire and transportation hazards.

It is therefore the object of this invention to provide a liquid fuel storage tank for this purpose whereby the maximum amount of liquid fuel will be trapped in the tank and a minimum amount of the same will be released in case the tank is turned into an unusual position and fittings are broken off the same or holes punched therein through which liquid fuel can escape.

A further object of this invention is to provide a tank of this character which is comparatively simple in construction, efficient and reliable in operation and capable of being manufactured economically and thus facilitates general use of the same.

In the accompanying drawings:

Fig. 1 is a side elevation, partly in section, of a liquid fuel storage tank for use on trucks embodying an approved form of this invention.

Fig. 2 is a top plan view of the same.

Fig. 3 is an end elevation thereof.

Fig. 4 is a longitudinal section, on a reduced scale, showing the operation of the same when tilted toward one of its ends.

Fig. 5 is an elevation, partly in section, showing the operation of this tank when the same is lying on one of its normally vertical longitudinal sides.

Fig. 6 is a similar view of the same when tipped into an inclined position on one of the outer vertical corners of its side chamber.

Fig. 7 is a fragmentary sectional view, on an enlarged scale, showing one form of check valve suitable for automatically opening and closing a vent port leading from a side chamber of the tank to the outer atmosphere.

Fig. 8 is a vertical longitudinal section of a liquid fuel tank showing a modification of this invention.

Fig. 9 is a top plan view thereof, with parts of the upper outer corners of the tank broken away.

In the following description similar reference characters indicate like parts in the several views of the drawings.

The liquid fuel tank which is more particularly suited for use in connection with the present invention is of the type adapted to be mounted astride of an automobile truck in the manner of a saddle for carrying an extra or auxiliary supply of gasolene in addition to that usually carried in the ordinary cylindrical storage tank forming part of the standard equipment of the truck. In its preferred construction this auxiliary fuel storage tank comprises a horizontal intermediate chamber 10 which is adapted to be mounted transversely on the top of the truck frame, and two vertical side chambers 11, 12 which are adapted to be arranged in an upright position on opposite sides of the truck frame and project downwardly from opposite ends of the intermediate chamber and generally resembling a pannier.

Filling of the tank with gasolene or other liquid fuel may be effected in various ways, but this is usually done through filling tubes having main parts 13 arranged horizontally and transversely in the upper part of the tank adjacent to either side thereof and having their inner outlet ends opening into the intermediate chamber of the tank while the outer inlet ends of these filling tubes project upwardly through the top wall 14 of the tank and are normally closed externally of the tank by covers or caps 15 of any suitable construction.

Gasolene is withdrawn from the tank for use in the engine which operates the truck or for other purposes through two upright fuel delivery pipes 16, 17 which are arranged within the tank and the lower inlet ends of which are located, respectively, adjacent to the bottoms 18 of the side chambers 11, 12 and the upper outlet ends of which project through the top 14 of the tank adjacent to the front upright longitudinal wall 25 of the tank, where suitable means are provided for connecting these delivery pipes with the means whereby the gasolene is withdrawn from the tank and delivered to the place of consumption.

As the gasolene is filled into the tank and withdrawn therefrom air is permitted to escape from the tank and to enter the same in accordance with the changing level of the liquid in the tank through a vent opening formed by a short breathing tube 19 which projects upwardly from the central part of the top 14 adjacent to the front longitudinal upright wall 25 of the intermediate chamber 10 and provided with a guard 20 over the same to prevent foreign matter from reaching the interior of the tank through this vent opening.

Safety means are provided which embody the present invention for the purpose of reducing to a minimum the escape of gasolene from the tank in case of an accident whereby holes may be punched into a wall of the tank or fittings ripped therefrom which safety means in the form shown in Figs. 1-8 are constructed as follows:

The numeral 21 represents the horizontal section and 22 the vertical section of a baffle, partition or bulkhead whereby the interior of each side gasolene chamber of the storage tank is divided so as to confine the major part of the gasolene therein in case the tank is overturned more or less and possibly injured as the result of an accident. Each horizontal section 21 of this baffle extends from one outer end of the bottom wall 32 of the intermediate chamber 10 outwardly and stops short of the outer wall 24 of the respective side chamber and the vertical section 22 of this baffle extends from the outer end of the horizontal baffle section downwardly to within a short distance from the bottom of this side chamber, while the side edges of these baffle sections are connected with the adjacent vertical front and rear longitudinal walls 25, 26 of the tank, as shown in Figs. 1-6, and thereby form a narrow passage 27 within the respective side chamber between the outer side wall 24 thereof and the vertical baffle section 22 therein which establishes communication between the interior of the respective side chamber and the corresponding end of the intermediate chamber of the tank, as best shown in Figs. 1 and 5.

Check valve means are provided whereby the upper ends of the side chambers or compartments 11, 12 of the tank are placed in communication with the opposite ends of the intermediate chamber or compartment of the same, while the tank is in its normal upright position, or nearly so, but communication is cut off between the respective end of the intermediate chamber and whichever side chamber is elevated to a considerable extent relative to the rest of the tank. Although the check valve means for this purpose may be variously constructed those best shown in Figs. 1, 4 and 7 for this purpose are suitable and comprise two tubular valve cases 28 arranged respectively within the side chambers adjacent to the inner front upper corners of the same and each of these cases inclining obliquely downwardly and outwardly toward the central part of the respective side chamber and having its elevated inner end connected with the respective baffle section 21 and communicating with the corresponding end of the intermediate chamber 10 while its outer part is provided with an opening 29 which communicates with the upper part of the respective side chamber and the central part of this case has a port surrounded by an outwardly facing valve seat 30, and a ball valve 31 is arranged in the outer part of this case and is movable by gravity toward and from this seat for opening and closing this port.

When the tank is in its normal upright position, as shown in Figs. 1, 3 and 7, the valves 31 of both safety check valves roll by gravity into their outermost positions in which they engage the outer ends of the cases 28 and uncover the ports of the valve seats 30 and thus permit gasolene to be freely introduced into the side chambers of the tank and also removed therefrom during filling gasolene into the tank through the filling tube 13 or withdrawing the same through the discharge pipes 16 for use. During this time air is free to escape from the upper ends of the side chambers and to the vent 19 and also enter the same while the level of the liquid is below these check valves. At this time the gasolene is prevented from swashing transversely in the side chambers by the vertical sections 22 of the baffles therein and the gasolene is also prevented from swashing transversely through the intermediate chamber 10 from one side chamber to the other by the horizontal sections of the baffles when the truck on which the tank is mounted rocks sidewise while in operation.

If the tank is tipped sidewise due to any cause and one of the side chambers is elevated an abnormal distance relative to the other parts of the tank, as shown for example toward the left in Fig. 4, all the gasolene below the vent 19 will be retained in the left side chamber or partly in this chamber and the left part of the intermediate chamber, depending on the amount of gasolene in the tank as a whole due to the left check valve 31 being open at this time, but any gasolene within the right side chamber and the respective baffle passage 27 will be retained in the right side chamber due to the right check valve 31 being closed automatically, while only that part of the gasolene, if any, which is left in the right part of the intermediate chamber is free to escape through the vent 19 to the exterior of the tank. When tipping the tank toward the right and raising the left side chamber an abnormal extent above the other parts of the tank the operation of the check valves and baffles will be reversed and produce the same effect as that just described when tipping the tank toward the left. Substantially the same conditions exist when the tank is overturned so that its rear vertical wall 26 is lowermost and one of its side chambers is elevated relative to the rest of the tank, as shown in Fig. 6.

In case the tank is overturned so that its rear wall lies horizontally and all the chambers of the tank are on the same level, as shown in Fig. 5, then all the outlets of the tank are open but as the same at this time are all above the level of the gasolene in the several chambers of the tank no gasolene will escape therefrom.

If desired the vertical sections of the baffles may be omitted and instead the horizontal sections of the same may be extended from opposite ends of the bottom 32 of the intermediate chamber 10 to outer walls 24 of the side chambers, as shown at 33 in Figs. 8 and 9, and each of these horizontal baffle sections may be provided adjacent to its outer rear corner with an opening 34 for the purpose of establishing communication between the side chambers and the intermediate chamber of the tank.

The operation of the safety device in the modified form of this invention, as shown in Figs. 8 and 9, is substantially the same as that described relative to the construction shown in Figs. 1-7, excepting that swashing of gasolene in the side chambers is possible due to the absence of vertical baffle sections therein.

Both forms of this invention reduce to a minimum the amount of gasolene which can escape from the tank if the same is upset, punctured or damaged and thus cause the greatest amount of liquid to be trapped and retained in the tank in most cases regardless of where the tank was punctured, thereby eliminating to a great extent possible fire hazards and losses incident thereto.

By reducing to a minimum the escape of liquid from the tank exposure of the liquid to fire is decreased, and the possibility of feeding a fire that has been started in some manner reduced, thereby facilitating the fire control.

By means of the gravity operated check or vent valves it is possible for vapors or fumes to escape freely from the side chambers to the outer atmosphere, otherwise the liquid fuel when heated or boiled by an external fire would be forced out of the vent 19 and trap fumes or vapor in the top of the side chambers and thus partially defeat the purpose of this invention.

It has been found by past experience that in the majority of truck accidents the same come to rest either in an upright position or lying on their side in which cases flow of liquid from the side chambers to the intermediate chamber is controlled by the check valves, either one or both of which are open under these conditions. When, however, the truck is completely turned upside down both the check valves are closed and trap the gasolene in the side chambers due to the vertical baffle sections extending close to the bottoms of these chambers in the construction shown in Figs. 1–4, but vapors are free to escape through the vent opening 19 to the outer atmosphere.

I claim as my invention:

1. Means for storing liquid fuel comprising a tank having a horizontal chamber provided in its upper part with a liquid inlet and a vent opening and a vertical side chamber communicating at its upper end with an end of said horizontal chamber and provided in its lower part with a liquid outlet, and a baffle having a horizontal section extending across the upper part of said side chamber and having one end connected with the inner wall thereof while its outer end is separated from the outer wall of the side chamber by a passage connecting said chambers.

2. Means for storing liquid fuel comprising a tank having a horizontal chamber provided in its upper part with a liquid inlet and a vent opening and a vertical side chamber communicating at its upper end with an end of said horizontal chamber and provided in its lower part with a liquid outlet, and a baffle having a horizontal section extending across the upper part of said side chamber and having one end connected with the inner wall thereof while its outer end is separated from the outer wall of the side chamber by a passage connecting said chambers, and a vertical section extending downwardly from the outer end of said horizontal section and terminating at its lower end short of the bottom of said side chamber.

3. Means for storing liquid fuel comprising a tank having a horizontal chamber provided in its upper part with a liquid inlet and a vent opening and a vertical side chamber communicating at its upper end with an end of said horizontal chamber and provided in its lower part with a liquid outlet, and a baffle having a horizontal section extending across the upper part of said side chamber and having one end connected with the inner wall thereof while its outer end is separated from the outer wall of the side chamber by a passage connecting said chambers, and a check valve whereby the upper inner part of the side chamber is placed in communication with the horizontal chamber when the tank is in its normal upright position, but cuts off this communication when the tank is turned into an abnormal position.

4. Means for storing liquid fuel comprising a tank having a horizontal chamber provided in its upper part with a liquid inlet and a vent opening and a vertical side chamber communicating at its upper end with an end of said horizontal chamber and provided in its lower part with a liquid outlet, and a baffle having a horizontal section extending across the upper part of said side chamber and having one end connected with the inner wall thereof, while its outer end is separated from the outer wall of the side chamber by a passage connecting said chambers, said check valve comprising a valve case which is arranged in the upper part of the side chamber and inclines outwardly toward the outer wall of the side chamber and toward the central part of the space within the same and which communicates at its elevated inner end with said horizontal chamber and at its lowered outer end with the interior of the side chamber and has a port in its central part surrounded by an outwardly facing valve seat, and a ball valve arranged in said valve case and movable toward and from said valve seat for closing and opening said port.

5. Means for storing liquid fuel comprising a tank having a horizontal intermediate chamber provided centrally with a vent opening and two side chambers communicating at their upper ends with the opposite end of said horizontal chamber, a filling tube extending from the exterior of the tank to the interior of the same, and baffles extending across the upper parts of the side chambers and having their inner ends connected respectively with the inner walls of the side chambers and their outer ends separated from the outer walls thereof by passages which connect the side chambers with said intermediate chamber.

6. Means for storing liquid fuel comprising a tank having a horizontal intermediate chamber provided centrally with a vent opening and two side chambers communicating at their upper ends with the opposite end of said horizontal chamber, a filling tube extending from the exterior of the tank to the interior of the same, and baffles each of which has a horizontal section extending across the upper part of one side chamber and connected at its inner end with the inner wall of the respective side chamber while its outer end terminates short of the outer wall of this side chamber, and a vertical section extending downwardly from the outer end of the respective horizontal section and terminating short of the bottom of the respective side chamber.

7. Means for storing liquid fuel comprising a tank having a horizontal intermediate chamber provided centrally with a vent opening and two side chambers communicating at their upper ends with the opposite end of said horizontal chamber, a filling tube extending from the exterior of the tank to the interior of the same, and baffles each of which has a horizontal section extending across the upper part of one side chamber and connected at its inner end with the inner wall of the respective side chamber while its outer end terminates short of the outer wall of this side chamber, and a vertical section extending downwardly from the outer end of the respective horizontal section and terminating short of the bottom of the respective side chamber, and check valves each of which places the upper inner part of one of the side chambers in communication with the intermediate chamber when the tank is in its upright normal position but cuts off communication between these chambers when the respective side chamber is elevated to an abnormal extent relative to the rest of the tank.

8. Means for storing liquid fuel comprising a tank having front and rear transverse walls, a horizontal intermediate chamber provided on its upper part adjacent to said front wall with a vent and two vertical side chambers connected at their upper ends with opposite ends of said intermediate chamber, a liquid inlet leading to the upper part of the tank adjacent to said front wall, pipes for withdrawing liquid from said side chambers, baffles having horizontal sections arranged across the upper parts of said side chambers and each connected at its inner end with the inner wall of one of the side chambers and separated at its outer end from the outer wall of the respective side chamber by an intervening passage, and check valves arranged adjacent to said front wall and the inner walls of the side chambers and each of which places the upper inner part of one of the side chambers in communication with the intermediate chamber when the tank is in its normal upright position but cuts off communication between these chambers when the respective side chamber is elevated an abnormal extent relative to the rest of the tank.

MAHLON C. SNYDER.